April 19, 1955 W. W. PHARIS 2,706,750

INTERCEPT CIRCUIT

Filed Dec. 6, 1952 5 Sheets-Sheet 1

FIG. I

INVENTOR.
WILLIAM W. PHARIS
BY Francis E. Blake
ATTORNEY

April 19, 1955 W. W. PHARIS 2,706,750

INTERCEPT CIRCUIT

Filed Dec. 6, 1952 5 Sheets-Sheet 2

INVENTOR.
WILLIAM W. PHARIS

BY Francis E. Blake
ATTORNEY

April 19, 1955 W. W. PHARIS 2,706,750
INTERCEPT CIRCUIT
Filed Dec. 6, 1952 5 Sheets-Sheet 3

INVENTOR.
WILLIAM W. PHARIS
BY [signature]
ATTORNEY

April 19, 1955 W. W. PHARIS 2,706,750

INTERCEPT CIRCUIT

Filed Dec. 6, 1952 5 Sheets-Sheet 4

INVENTOR.
WILLIAM W. PHARIS
BY Francis E. Blake
ATTORNEY

INTERCEPT CIRCUIT

Filed Dec. 6, 1952 5 Sheets-Sheet 5

COMMON INTERCEPT TRUNK CIRCUIT FIG. 5

INVENTOR.
WILLIAM W. PHARIS
BY Francis E. Blake
ATTORNEY

United States Patent Office 2,706,750

Patented Apr. 19, 1955

2,706,750

INTERCEPT CIRCUIT

William W. Pharis, Rochester, N. Y., assignor to Stromberg-Carlson Company, a corporation of New York Application December 6, 1952, Serial No. 324,436

9 Claims. (Cl. 179—27)

Figure 1:
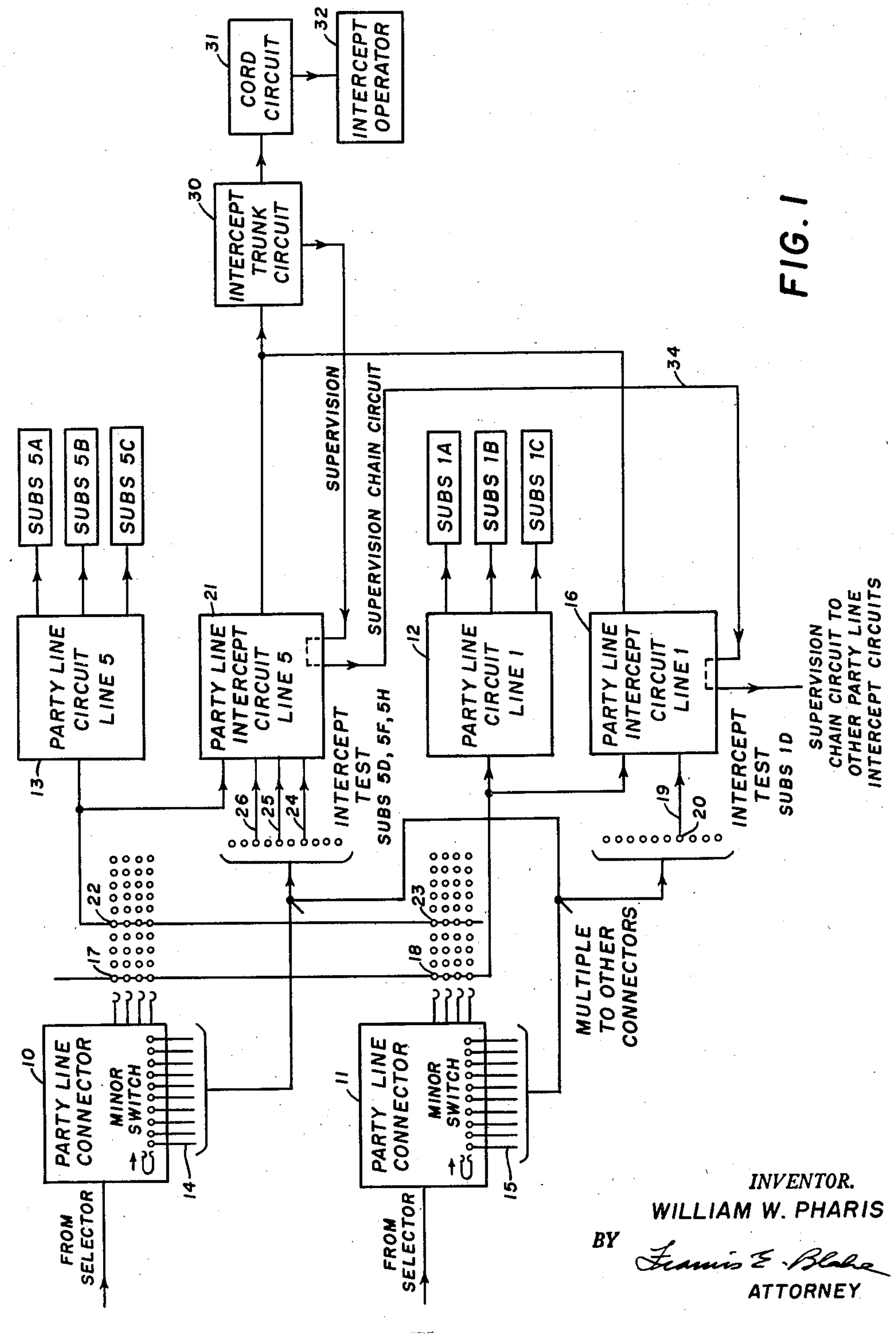

The present invention relates to dial telephone systems and more particularly to intercept circuits for use with dial telephone systems of the party line type.

The use of intercept circuits in dial telephone systems is well known for the purpose of intercepting a call and referring the call to an intercept or information operator when the call to a called party cannot be completed for any one of a number of well known reasons. The prior art intercept circuits used with dial telephone systems have employed alternating current relays connected in circuits to respond to the application of ringing voltage from the connector or final selector to the intercept circuit to thereby activate the intercept circuit in a manner to intercept the call and signal the intercept operator. In my copending application, Serial Number 301,011, filed July 26, 1952, and assigned to the assignee of the present application, I have described an intercept circuit arranged to be automatically operated by the directive operation of a connector or a final selector to the terminals of a line to be intercepted without the use of ringing voltage responsive alternating current relays to activate the intercept circuit. The arrangement of my prior patent application is not entirely suitable for use in a dial telephone system having party lines inasmuch as the circuit arrangements for activating the intercept circuit as disclosed therein will not discriminate between calls to various parties on a party line having certain party calls to be intercepted.

There are many well known arrangements for providing party line operation in dial telephone systems. One such arrangement with which the intercept circuit of the present invention may be used to advantage is to provide a plurality of different frequencies of ringing current, each of which is designated for a different party on the line, and providing all of the parties on the line with different frequency selective ringers bridged across the line and corresponding to the designated frequency of ringing current for the respective party. The party line connector for selecting the party line is provided with a directively operated switch to select the desired frequency of ringng current for the desired party to be called on the party line. In the conventional system, such switch may have as many as ten directively controlled positions or terminals corresponding to the impulses of digits one to zero, while the number of party identifying ringing current frequencies to be provided by the ringing generators may often be less than ten and preferably not more than five different frequencies. However, the party line intercept circuits of the prior art, arranged to respond to ringing current of the identifying frequency for the party call to be intercepted, necessarily made it impossible to reassign to an idle terminal of the directively operated switch the ringing current frequency of a party call to be intercepted for ringing a party call not to be intercepted.

It is an object of the present invention to provide an improved intercept circuit which may be used with dial telephone party line systems and which does not require the use of ringing current to activate the intercept circuit and which also enables the frequency of ringing current for those party calls to be intercepted to be reassigned to calls for another party not to be intercepted.

In order to enable the frequency of ringing current for an intercepted party call to be reassigned for calls to another party not to be intercepted, it is a further object of the invention to provide an intercept circuit that functions to immediately prevent the application of ringing current to the party line for a party call to be intercepted and thereby prevent the inadvertent ringing on the party line and consequent signaling of a call to the party not to be intercepted who has the reassigned frequency of ringing current.

Another object of the invention is to provide a party line intercept circuit which immediately prevents the application of ringing current to the party line for party calls to be intercepted yet returns ringback tone to the calling party until the intercept operator answers the intercepted call.

A feature of the invention as applied to a dial telephone system having one or more party line connectors is the provision of a party line intercept line circuit for each party line having one or more parties to which calls are to be intercepted, each of the party line intercept line circuits being adapted to be connected through a common intercept trunk circuit to an intercept operator's position, there being provision in each party line intercept circuit to prevent the application of ringing current to the party line when the connector is directively operated for a party call to be intercepted and there being further provisions to prevent the simultaneous connecnection of more than one party line intercept line circuit to the common trunk circuit in a manner to store the intercepted calls in the party line intercept line circuits until the intercept trunk circuit is free to operate. In such an arrangement, there is further provision to return ringback tone from the party line intercept line circuit to the calling line without applying ringing voltage to the party line and continuing until the party line circuit is connected through the common intercept trunk circuit to the intercept operator. Also, according to the invention, a plurality of intercept party line circuits may be simultaneously activated to prevent the application of ringing current to the called party lines and the common intercept trunk circuit is connected in a supervisory chain circuit through the plurality of activated intercept party line circuits to individually and successively connect with the intercept line circuits for successively disposing of the intercepted calls by the intercept operator.

Figure 2:
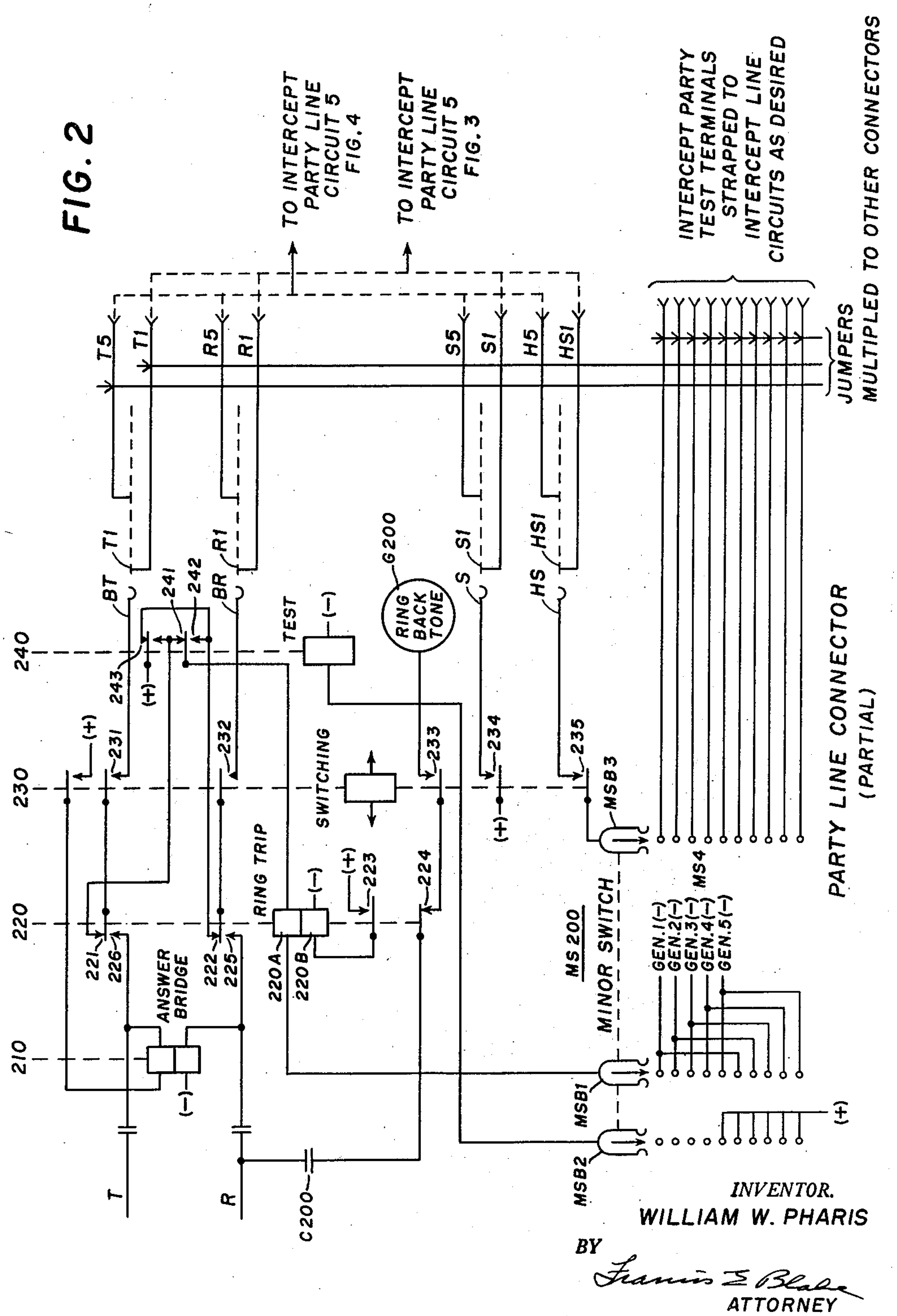
Figure 3:
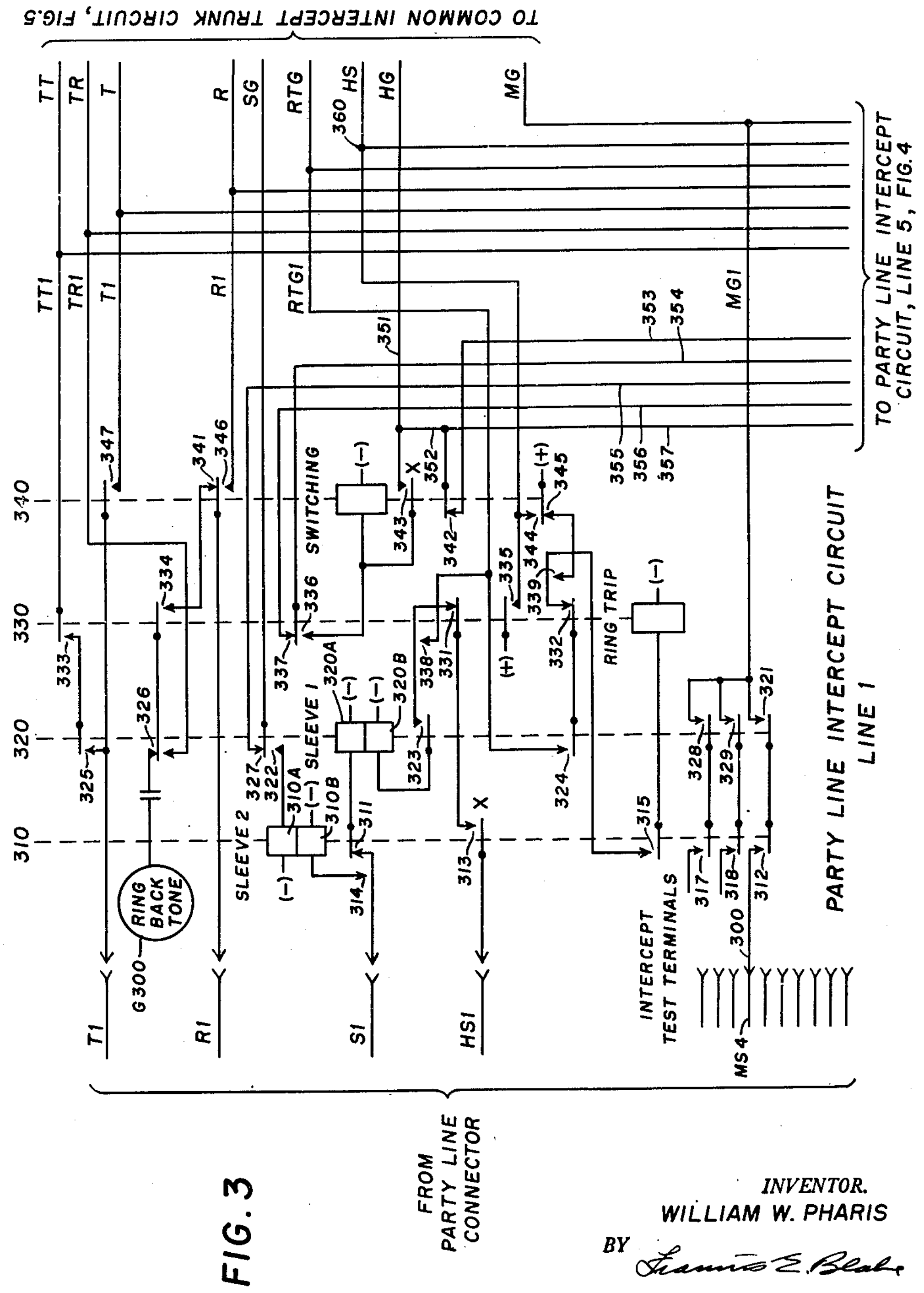
Figure 4:
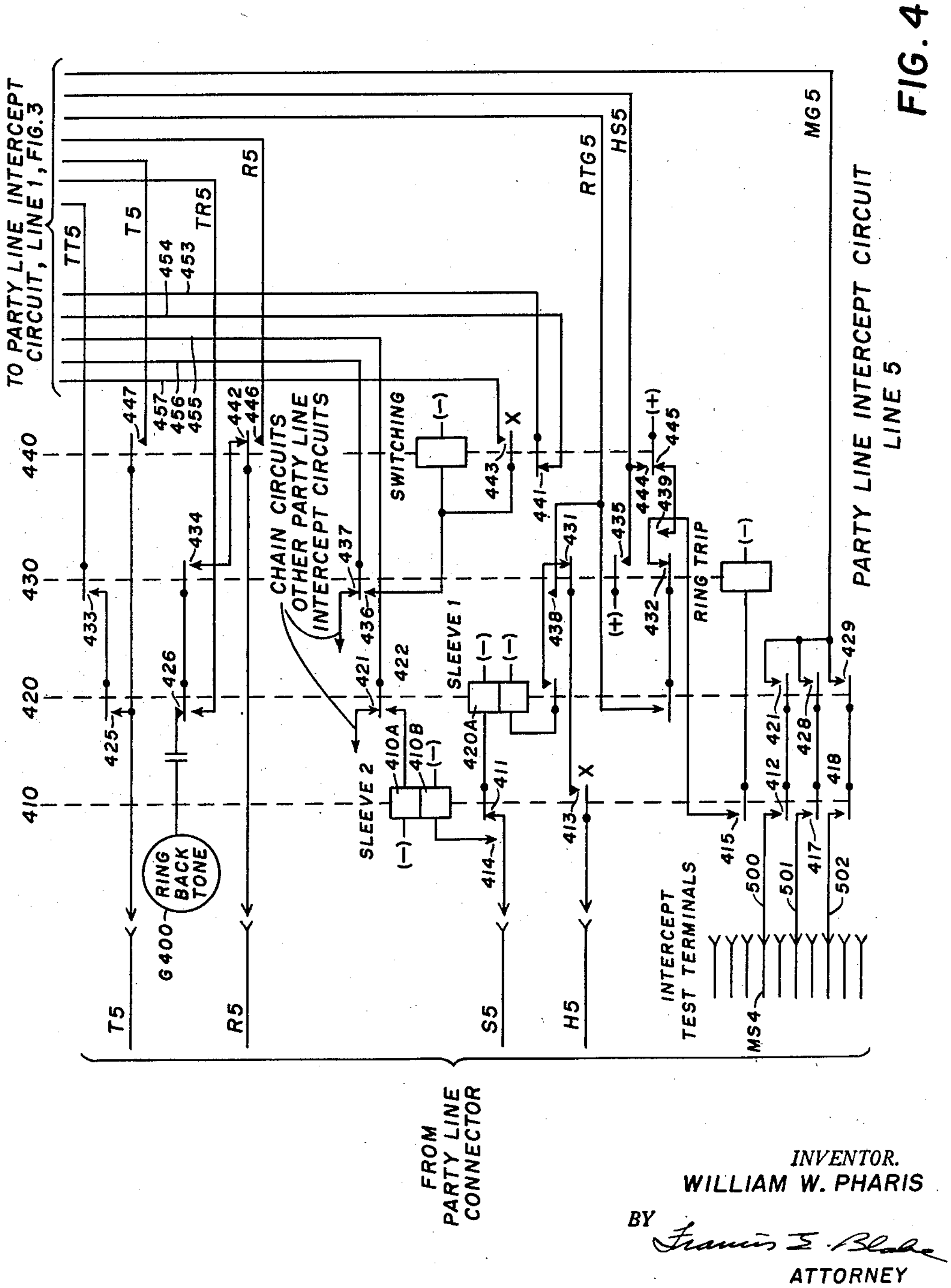
Figure 5:
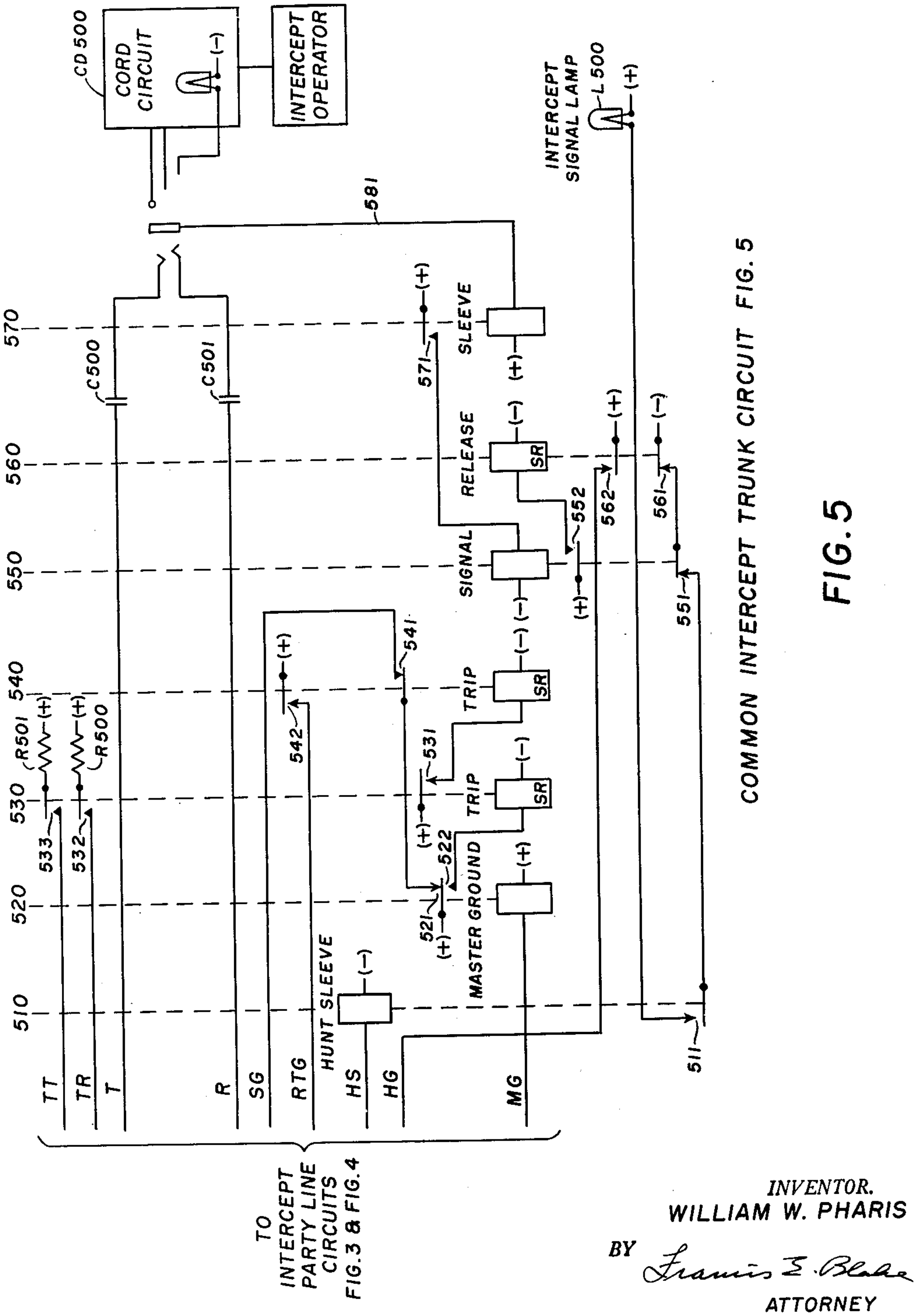

Further objects, features and the attending advantages of the invention will be apparent with reference to the following specification and drawings in which:

Fig. 1 is a block diagram of the intercept system of the invention arranged for operation with one or more party line connectors, Fig. 2 is a partial schematic diagram of a party line connector to which the intercept circuit of the invention is connected, Figs. 3 and 4, with Fig. 3 placed above Fig. 4, are schematic diagrams of respective intercept party line circuits for two party lines having party calls to be intercepted from the connector of Fig. 2 and showing the chain interlock or supervisory circuits between the party line intercept line circuits; and Fig. 5, when placed to the right of Fig. 3, is a schematic diagram of a common intercept trunk circuit for the intercept line circuits of Figs. 3 and 4.

Referring to Fig. 1 of the drawings, the general arrangement of the intercept circuit of the invention when used with a dial telephone system having party line connectors will now be described. The party line connectors 10 and 11 may be conventional, well known types having, for example, a directively operated switch for extending the connection from the selector to the party line circuits 12 and 13 for party line numbers 1 and 5, respectively. Each of the party line connectors 10 and 11 also may include a directively operated switch such as the minor switch shown within the connector block outline. The minor switch is operated by the impulses of the last or party identifying digit to select the frequency of ringing current to be rung on the party line. One well known arrangement for a dial telephone party line system is to provide a plurality of different party identifying frequencies of ringing current and each subscriber on the party line is provided with a frequency selective ringer bridged across the line to respond to the particular party identifying frequency of ringing current. For example, subscribers 5A, 5B and 5C, or subscribers 1A, 1B and 1C for the party line circuits 13 and 12, respectively, may be provided with corresponding different frequency of ringing current which is selectively applied to the party line by the directive operation of the minor switch in the party line connector. Such an arrangement is well known and its details will therefore not be further described.

In accordance with the present invention, each frequency selecting minor switch of each party line connector is provided with an additional bank of terminals such as shown at 14 and 15, respectively. After it has has been determined that calls to a particular party on the party line are to be intercepted, the particular minor switch terminal in the groups of terminals 14 or 15 corresponding to the directively operated position for selecting the frequency of ringing current to the party to be intercepted, is connected to activate a party line intercept line circuit for the party line to which the call to be intercepted is directed. For example, a party line intercept line circuit 16 for line number one is connected to the line number one connector group terminals 17 and 18 of the party line connectors 10 and 11, respectively, and is controlled and activated by the jumper connection 19 to terminal 20 of both minor switch terminal banks 14 and 15 so that calls to the party subscriber 1D of party line one will be intercepted. As another example, the party line intercept line circuit 21 for party line number five is connected to the line five connector groups terminals 22 and 23 of the party line connectors 10 and 11 in order to intercept certain designated party calls on line five. As shown, the jumper connections 24, 25 and 26 are connected to terminals of the minor switch terminal banks 14 and 15 corresponding to calls to subscribers 5D, 5F and 5H, respectively, so that when either party line connector and minor switch are directively operated to any of these terminals for extending calls to such parties to be intercepted, the party line intercept line circuit 21 will be activated.

The outgoing connections of each of the party line intercept line circuits 16 and 21 are connected to a common intercept trunk circuit 30 which in turn terminates in a cord circuit 31 at the intercept operator's position 32. As will be described in detail hereinafter, the party line intercept circuits 16 and 21 are arranged to immediately prevent the application of ringing current from the party line connectors 10 or 11 to the party line circuits 12 or 13, respectively, connected in parallel with the respective party line intercept line circuit. Therefore, a frequency of ringing current previously assigned to a particular ringing control terminal of the party line connector minor switch terminal banks 14 or 15, corresponding to a party call to be intercepted, may be reassigned to another unused ringing control terminal of the minor switch terminal banks 14 or 15 for use by another party on the party line for party calls not to be intercepted.

As previously mentioned, each of the party line intercept circuits such as shown at 16 and 21 are connected to a common intercept trunk circuit 30. While each party line intercept line circuit may be simultaneously activated by a different one of the party line connectors when two different party calls to be intercepted on different party lines are simultaneously received, the invention provides that only one at a time of the intercept party line circuits 16 or 21 will be switched through to the common intercept trunk circuit 30 and intercept operator 32. In order to prevent the simultaneous connection of two or more party line intercept circuits such as the circuits 16 and 21, a supervisory chain circuit 34 is arranged to prevent the switching through of the party line intercept circuit 16 so long as the party line intercept circuit 21 is switched through to the intercept trunk circuit 30. Thus, in such manner, each party line intercept line circuit may be activated to prevent the connection of ringing voltage to the party line and to return ring-back tone to the calling party while awaiting connection to the intercept trunk circuit 30 and the intercept operator.

In the following description the power source for the relay circuits is not shown but it should be understood that a direct current source is used with its positive terminal connected to ground and referred to as ground and with its negative terminal identified as battery. Referring now to Figs. 2–5 of the drawings for a more detailed description of the invention, and more particularly to Fig. 2 of the drawings which is a partial schematic of a party line connector, it will be assumed that a call to party subscriber 1D is being received and that the connector switch brushes BT and BR have been directively moved to engage tip terminal T1 and ring terminal R1. At the same time, the connector switch brushes S and HS have also been directively moved into engagement with the connector line terminals S1 and HS1. It has been previously determined that calls to the party 1D are to be intercepted and therefore the party D terminal MS4 of the connector minor switch MS200 is connected by the jumper connection 300 to the party line intercept line circuit for line number one as shown in Fig 3. The minor switch MS200 is otherwise conventional and is connected to apply ringing current from a selected one of the five different frequency ringing current generators 1–5 through the minor switch brush MSV1 and coil 220A of the ring trip relay 220, through normal contacts 241, 221, and operated contacts 231 to the connector brush BT and the party line tip conductor T1. In the event that the minor switch MS200 is directively operated to terminal 6—0, the minor switch brush MSB2 connects ground through the coil of the test relay 240 to battery to energize such relay and connect the ringing current generator 1–5 through operated contacts 242, normal contacts 222, and operated contacts 232 to the connector switch brush BR and the ring conductor R1 of the selected party line. The arrangement for determining the frequency of ringing current and the side of the line to which the ringing current is applied, is well known and need not be further described it being understood that each of the parties on the party line are provided with frequency selective ringers bridged across the line to respond to the particular party identifying frequency of ringing current. It was assumed in the previous description that the switching relay 230 has been operated by the normal operation of the connector to therefore close contacts 231 and 232 for applying the ringing current to the party line.

It will be noted that the ringing current generators 1–5 are also connected to the connector battery so that when the called party answers, a D. C. circuit may be established from the ringing generator battery through the then closed loop of the called line to ground to thereby energize the ring trip relay 220. For example, assuming the minor switch MS200 to have been directively operated to ring a party for a party call not to be intercepted such as, for example, party line one, subscriber 1A, ringing current generator one and battery will be connected through the minor switch brush MSB1, ring trip coil 220A, normal contacts 241, 221, and operated contacts 231 to the tip conductor T1 of the called line and when the called party answers in response to the ringing, a direct current loop will be closed to the ring conductor R1 and connnector brush BR to operated contacts 232 and normal contacts 222 and 243 to ground. In such manner, the ring trip relay 220 is operated to close contacts 223 and connect a holding circuit for itself through coil 220B from ground to battery. During the previous application of ringing current to the called line, switching contacts 233 were closed and ringback tone from the ringback tone generator G200 was applied through normal contacts 224 and the condenser C200 back to the calling party. The aforementioned operation of the ring trip relay 220 opened contacts 224 to disconnect the ringback tone, and closed contacts 225 and 226 to connect the answer bridge relay 210 and the calling line conductors T and R to the connector switch brushes BT and BR. Thereafter the operation of the circuit is conventional when extending a party call to a party not to be intercepted, and it will be noted that the operation of the switching relay 230 has also operated contacts 234 to apply a holding ground to the sleeve brush S and the party line sleeve terminal S1.

Now, again referring to the assumption that the call is to be extended to party subscriber 1D and that all such calls are to be intercepted, the connector minor switch MS200 has been directively moved to engage the contact for connecting ringing current generator 4 to the party line and simultaneously the switch brush MSB3 has been directively operated to minor switch terminal MS4. At the same time, switching relay 230 of the connector has been operated in the well known manner to close contacts 234 and apply ground over the sleeve brush S and the party line sleeve terminal S1 to the party line circuit and also the party line intercept line circuit for line number one as shown in Fig. 3 of the drawings. The connection of ground on the sleeve conductor S1 is connected through normal contacts 311 to the winding 320A of the sleeve one relay 320 to battery thereby operating relay 320. The operation of relay 320 closes contacts 321 to prepare a circuit to the intercept jumper connection 300 to the minor switch terminal MS4 of the connector in Fig. 2. At the same time, contacts 322 are closed to energize the sleeve two relay 310 from battery through winding 310A, operated contacts 322, sleeve ground lead SG and normal contacts 541 and 521 to ground in the common intercept trunk circuit of Fig. 5. The operation of the sleeve two relay 310 closes contacts 312 to complete a circuit from ground in the common intercept trunk circuit of Fig. 5 through the master ground relay 520 to the MG lead and the MG1 lead through operated contacts 321 and 312, intercept jumper connection 300, minor switch terminal MS4 and minor switch brush MS3, through operated contacts 235 of the switching relay 230 to the connector HS brush and the HS1 lead of the party line. The HS1 lead in the party line intercept line circuit in Fig. 3 is connected through operated preliminary make contacts 313 and normal contacts 331 to operated contacts 323 and winding 320B of sleeve one relay 320 so that a holding circuit for relay 320 is established to be operated simultaneously with the master ground relay 520 of Fig. 5. The aforementioned operation of relay 310 opened contacts 311 and closed contacts 314 to provide a holding circuit for relay 310 from the ground on the S1 lead from the connector switch brush S and operated contacts 234 of the connector switching relay 230.

It will now be observed that the master ground relay 520 in the common intercept trunk circuit of Fig. 5 is now operated through the circuit including operated contacts 321 and 312 and the intercept jumper connection 300 to the minor switch of the connector. The operation of relay 520 closes contacts 522 to energize the slow-release trip relay 530 through the obvious circuit which closes contacts 531 to energize the slow-release trip relay 540 through the obvious circuit. The operation of the slow-release trip relay 530 also closes contacts 532 and 533 to connect ground through resistors R500 and R501, respectively, to the TR and TT leads for preparing a circuit to operate the ring trip relay 220 of the party line connector in a manner to be described. Still assuming the call to be intercepted to be that call for party 1D, the ringing current generator 4 and battery is arranged to be connected through the minor switch brush MSB1 and the previously traced circuit to the tip conductor T1 of the party line. The operation of contacts 533 in the common intercept trunk circuit is effective to connect ground through resistors R501 and the TT conductor to the TT1 conductor of the party line intercept circuit of Fig. 3. At the same time, the operation of the trip relay 540 closes contacts 542 to connect ground to RTG lead and the RTG1 lead of the party line intercept circuit of Fig. 3 which is extended through operated contacts 324 and normal contacts 332 to operated contacts 315 and the coil of the ring trip relay 330 to battery. In such manner, the ring trip relay 330 in the party line intercept line circuit for line number one is operated to close contacts 333 and extend the resistance ground to the TT1 lead through operated contacts 325 to the party line tip conductor T1 and the connector brush BT. Such resistance ground is further extended through operated contacts 231 and normal contacts 221 and 241 to the ring trip relay coil 220A and minor switch brush MSB1 to generator 4 and battery thus completing a direct current circuit to operate the ring trip relay 220.

The above described operation of the ring trip relay 220 immediately prevents the application of ringing current from the generator 4 to the party line since the described operations of relays 310, 320, 520, 530, 540 and 330 are very fast. As previously mentioned, the application of ringback tone from the ringback generator G200 is also interrupted when ring trip relay 220 operates by the then open contacts 224. However, ringback tone is still returned to the calling party after operation of the ring trip relay 220 in view of the following described operations of the circuits of Figs. 3 and 5. It will be recalled that trip relays 530 and 540 are slow-release relays and it will be noted that these relays are energized so long as the master ground relay 520 remains operated. The operating circuit for the master ground relay 520 extends from ground through the relay coil to the MG1 lead and through a circuit including operated contacts 321, 312, intercept jumper 300, minor switch terminal MS4, minor switch brush MSB3, operated contacts 235, 313 and normal contacts 331 to operated contacts 323 and the coil of sleeve one relay 320 to battery. The aforementioned operation of the ring trip relay 330 in the party line intercept line circuit, line one, to secure the operation of the ring trip relay 220 of the party line connector, opens the normally closed contacts 331 breaking the holding circuit to the sleeve one relay 320 in series with the master ground relay 520 so that both relays 320 and 520 are restored after the ring trip relay 330 operates. Thereafter, the slow-release relays 530 and 540 release in sequence and the resistance grounds through resistors R500 and R501 are again available for operating the ring trip relay of another party line connector for another party call to be intercepted. At the same time, the restoration of the sleeve one relay 320 of the party line intercept line circuit, line one, of Fig. 3, restores normal contacts 326 to connect ringback tone from the ringback tone generator G300 through said contacts 326 and operated contacts 334 to normal contacts 341 and the party line ring conductor R1 back to the calling party through the connector switch brush BR and operated contacts 232 and 225.

The connection of ringback tone, as just described, assures the calling party that the call is yet to be completed and will be maintained until the switching relay 340 of the party line intercept line circuit, line 1, of Fig. 3, is operated to connect the incoming call in the intercept line circuit to the common intercept trunk circuit of Fig. 5 and the intercept operator. The previously described operation of the ring trip relay 330 of the party line intercept line circuit of Fig. 3 closes contacts 335 to connect ground to the HS lead of the common intercept trunk circuit of Fig. 5 and through the coil of hunt sleeve relay 510 to battery thereby operating such relay. The operation of relay 510 closes contacts 511 to complete a circuit from battery through normal contacts 561 and 551 to the intercept operator's signal lamp L500 and ground, thus lighting the lamp to signal the operator that a call is to be intercepted. Upon noting the energization of the signal lamp, the intercept operator plugs the cord circuit CD500 into the associated jack for the common intercept trunk circuit thereby connecting the resistance battery to the sleeve conductor 581 and through the coil of the sleeve relay 570 to ground, thereby operating relay 570. The operation of relay 570 closes contacts 571 to connect ground to the coil of the signal relay 550 and battery to thereby operate such relay to open contacts 551 and deenergize the intercept signal lamp. At the same time, contacts 552 are closed to energize the coil of the slow-release relay 560 from battery, thus operating such relay to close contacts 562 and extend ground over the HG lead to the party line intercept line circuit, line one, of Fig. 3. The ground on the HG lead from Fig. 5 is conducted over leads 351 and 352, through normal contacts 342 to the supervisory chain interlock lead 353 and lead 453 of Fig. 4, to normal contacts 441 and lead 454, back to lead 354 of Fig. 3, and operated contacts 336 to the coil of switching relay 340 and battery. Switching relay 340 is thereby operated to close preliminary make contacts 343 providing a locking circuit for relay 340 from the ground in the lead 351 and the HG lead of the common intercept trunk circuit of Fig. 5. At the same time, contacts 344 are closed and contacts 345 are opened, thus restoring ring trip relay 330 and connecting ground to the HS lead for maintaining the operation of the hunt sleeve relay 510 of the common intercept trunk circuit. With the switch relay 340 operated, contacts 346 and 347 are closed to extend the call from the connector to the common intercept trunk circuit leads T and R and the condensers C500 and C501 to the cord circuit CD500 and the intercept operator.

In the previous paragraph the operation of the switching relay 340 was traced through a supervisory chain circuit including conductors 351, 352, 353, 453, 454 and 354 and this circuit will be referred to again in detail, its purpose being to prevent the operation of the switching relay 440 of party line intercept trunk circuit for line five, shown in Fig. 4, while the switching relay 340 of the party line intercept circuit for line one, shown in Fig. 3, is operated. In this connection it will be noted that the operation of the switching relay 340 opens contacts 342 which prevents the further connection of the operating ground from the HG lead of the common intercept trunk circuit to the conductor 353.

After the intercept operator has informed the calling party of the condition of the called line, or that the call may not be extended thereto, the calling party may hang up to restore all of the connector circuits. During the connection of the call to the intercept operator, relays 510, 550, 560 and 570 of the common intercept trunk circuit of Fig. 5 are operated and relays 310 and 340 of the party line intercept circuit for line one are operated. When the calling party hangs up, the ground is removed from the S1 lead of the party line and the sleeve two relay 310 of the party line intercept line circuit, line one, restores. Thereafter the intercept operator may unplug the cord circuit to restore relays 570 and 550 and begin the restoration of the slow-release relay 560. While the slow-release relay 560 is restoring, the contacts 561 are open to prevent any undesirable flashing of the intercept signal lamp L500. The restoration of relay 560 opens the holding circuit consisting of ground on the HG lead to the party line intercept line circuit switching relay 340 which thereupon restores and the circuits are then all returned to normal, ready for intercepting another call.

In the previous paragraphs I have described the operation of the intercept circuit when intercepting a call to party ID on the party line one by the operation of the party line intercept line circuit of Fig. 3. It will be recalled that the operation of the ring trip relay 220 of the connector was obtained by the D. C. circuit established through the operation of the sleeve one relay 320 and ring trip relay 330 of the party line intercept circuit for line one as shown in Fig. 3, and that the operation of these relays was secured through the operation of the connector minor switch MS200 and the operation of the master ground relay 520 and trip relays 530 and 540 of the common intercept trunk circuit of Fig. 5. The relays 520, 530 and 540 operate and then release in a comparatively short period of time causing the subsequent operation of the ring trip relay 330 and thereafter the release of the sleeve relay 320. All of this operation takes place very quickly so that the master ground relay 520 and trip relays 530 and 540 of the common intercept trunk circuit may again operate to secure the operation of a ring trip relay in another party line intercept line circuit and the associated connector such as, for example, the connector connecting with party line, number five. This operation may take place even though the common intercept trunk circuit shown in Fig. 5 is connecting the intercept operator to the party line intercept line circuit of line one and the party attempting to call party 1D. However, the operation of relays 520, 530 and 540 to initiate the ring trip function of the party line intercept line circuit of other intercept line circuits such as the circuit for line five is controlled through a supervisory chain circuit which prevents the operation of the ring trip circuit in Figs. 4 and 2 until the ringing trip function in Figs. 3 and 2 has been completed.

In order to describe this supervisory circuit in detail, it will be assumed that a call from the party line connector shown in Fig. 2 has been extended through the party line intercept circuit for line one shown in Fig. 3 to the common intercept trunk circuit of Fig. 5 and the intercept operator and that the operator is talking to the calling party. At this time, a call from another connector similar to that shown in Fig. 2 is directed to party 5D on party line number five. This call is intended to be intercepted as determined by the connection of the jumper 500 to the MS4 terminal of the connector minor switch 200. Ground is connected through operated contacts 234 and sleeve brush S to the sleeve conductor S5 of party line five and to coil 420A of sleeve one relay 420 and battery, thereby operating relay 420. The operation of relay 420 closes contacts 422 which establishes a circuit for energizing relay 410 through winding 410A from battery to the supervisory interlocking lead 455 connecting with lead 355 of the party line intercept circuit of line one, shown in Fig. 3. It is assumed that the sleeve one relay 320 of Fig. 3 is not at this time operated since the previous call to be intercepted on party line number one has completed the operation to prevent the ringing on the party line number one. In the event that the sleeve relay 320 is still operated in the process of operating the ring trip relay of the connector for the called party line number one, contacts 327 will be open and the circuit in line 355 to line 455 for operating sleeve relay 410 of the party line intercept circuit of line five in Fig. 4 will be incomplete. However, with the sleeve relay 320 restored, the sleeve relay 410 may be operated by the circuit from battery through relay coil 410A, operated contacts 422, lines 455, 355, normal contacts 327, and the SG conductor to the common intercept trunk circuit of Fig. 5 and normal contacts 541 and 521 to ground. Thereafter the operation of relays 410, 420, 520, 530 and 540 is as previously described in connection with the call to be intercepted through the party line intercept circuit of Fig. 3 and will not be again described in detail. In such manner, the operation of the ring trip relay 430 is obtained to operate the connector ring trip relay 220 of the party line connector extending the call to be intercepted to the party line intercept circuit for line five as shown in Fig. 4.

With the ring trip relay 430 operated and the sleeve relay 420 restored, ringback tone from the generator G400 is connected through normal contacts 426 and operated contacts 434 to normal contacts 442 and the ring conductor R5 of the party line thus notifying the calling party that the call is yet to be completed. Now, with the party line intercept circuit of line number five in the condition with sleeve relay 410 operated and ring trip relay 430 operated, ringback tone is continued to be returned to the calling party although the application of ringing current from the connector to the party line is prevented. It is not desired, however, to connect the calling party to the intercept operator since the intercept operator is at that time connected to the calling party on party line 1D that is intercepted over the intercept trunk circuit of Fig. 3. Therefore, means is provided to prevent the operation of the switching relay 440 of the party line intercept circuit for line number five shown in Fig. 4 so long as the switching relay 340 of the party line intercept circuit for line number one shown in Fig. 3 is operated. When the calling party that had been connected through the intercept line circuit of Fig. 3 with the intercept operator has hung up, the sleeve relay 310 will restore and when the intercept operator takes down the cord circuit CD500, the switching relay 340 will also likewise restore as previously described. When the switching relay 340 restores, contacts 344 open to disconnect ground from the HS lead to the hunt sleeve relay 510 of the common intercept trunk circuit of Fig. 5. The hunt sleeve relay 510, however, remains energized since ground is connected through operated contacts 435 of the ring trip relay in the party line intercept circuit for line five, shown in Fig. 4, to the HS5 lead connected at point 360 to the HS lead and the common intercept trunk circuit of Fig. 5. Therefore, contacts 511 remain closed and when the slow-release relay 560 has completely restored, the intercept signal lamp L500 is again energized to signal the intercept operator that another call is yet to be intercepted.

The intercept operator thereupon replugs the cord circuit CD500 to energize relays 570, 550 and 560 as previously described, and ground is connected to the HG lead of the intercept trunk circuit and through normal contacts 342 of the switching relay 340 and conductor 353, to conductor 453, normal contacts 441, conductors 454, 354, and normal contacts 337 to conductor 356. Conductor 356 connects with conductor 456 of Fig. 4 and operated contacts 436 of the ring trip relay 430 to the switching relay 440 and battery to thereby operate switching relay 440. Switching relay 440 connects a holding circuit for itself through operated preliminary make contacts 443 and conductor 457 to conductors 357, 352 and 351, to the HG lead of the common intercept trunk circuit of Fig. 5. Thus, in such manner, the switching relay 440 is operated to extend the call through the party line intercept circuit for party line number five to the common intercept trunk circuit of Fig. 5 after the intercepted call through the party line intercept circuit for line number one has been completed.

A complete detailed description of the operation of the intercept line circuit for line number five shown in Fig. 4 will not be made since the operation is otherwise the same as described in connection with Fig. 3. However, reference numerals in the four hundred series have been applied to Fig. 4 similar to the reference numerals in the three hundred series of Fig. 3 so that the description of Fig. 3 may be similarly applied to Fig. 4.

It should be obvious that any number of party line intercept circuits such as those of Figs. 3 and 4 may be connected and interlocked together by the supervisory interlock circuits including conductors 351—357 and conductors 453—457 so as to enable the common intercept trunk circuit of Fig. 5 to service a plurality of party lines having party calls to be intercepted. The normal contacts 427 and 437 are arranged to be connected serially to other party line intercept circuits in a similar manner to that in which the party line intercept circuit of Fig. 4 is connected to the party line intercept circuit of Fig. 3 through normal contacts 327 and 337.

It will be noted that each of the party line intercept circuits of Figs. 3 and 4 are provided with additional contacts such as 317, 318 and 328, 329 and 417, 418, 428 and 429 by means of which calls to other parties on the party line may be intercepted when the connector minor switch MS200 is directively operated to terminal points connected with such contacts by means of the jumper connections such as shown at 501 and 502 It should be understood that the particular party call to be intercepted is determined by the terminal of the minor switch to which the intercept jumper connections such as 300 and 500—502 are connected.

While the intercept circuit of the invention has been described in connection with its use with a party line connector having tip, ring, sleeve and hunt sleeve terminals, it should be understood that the principles of the invention may be used with any other well known type of dial telephone connector arranged for party line operation and using a directively operated switch for selecting the frequency of ringing current. Various modifications may be made within the spirit of the invention and the scope of the appended claims.

What I claim is:

1. In a telephone system including a calling line, a plurality of called party lines, and a directively operated party line connector for connecting the calling line with selected called party lines, said connector having directively operated means to select the mode of ringing for the selected party line in accordance with the desired party to be called on the party line together with means to connect the ringing current to the called line and means operative to trip the ringing current connection to the called line, the intercept circuit for intercepting calls to predetermined desired parties of selected called party lines including in combination, a plurality of party line intercept line circuits, a respective one each of said intercept line circuits being connected to a respective party line having parties for which calls are to be intercepted from said connector, a common intercept trunk circuit connected with all of said party line intercept line circuits, an intercept operator's cord circuit adapted to be detachably connected to said trunk circuit, and trip means in each of said intercept line circiuts connected with the ringing mode selecting means of the connector and adapted to be operated to operate the ringing trip means in said connector when a call to be intercepted is connected by said connector to the respective party line intercept line circuit.

2. In a telephone system including a calling line, a plurality of called party lines, and a directively operated party line connector for connecting the calling line with selected called party lines, said connector having directively operated means to select the mode of ringing for the selected party line in accordance with the desired party to be called on the party line together with means to connect the ringing current to the called line and means operative to trip the ringing current connection to the called line, the intercept circuit for intercepting calls to predetermined desired parties of selected called party lines including in combination, a plurality of party line intercept line circuits, a respective one each of said intercept line circuits being connected to a respective party line having parties for which calls are to be intercepted from said connector, a source of ringback tone in each of said line circuits, a common intercept trunk circuit connected with all of said party line intercept line circuits, an intercept operator's cord circuit adapted to be detachably connected to said trunk circuit, and trip means in each of said intercept line circuits connected with the ringing mode selecting means of the connector and adapted to be operated to operate the ringing trip means in said connector when a call to be intercepted is connected by said connector to the respective party line intercept line circuit, each of said trip means having circuit means to connect the respective one of said ringback tone sources to said calling line when the respective trip means is operated.

3. In a telephone system including a calling line, a called party line, and a directively operated party line connector for connecting the calling line with the selected called party line, said connector having directively operated means to select the mode of ringing for the selected party line in accordance with the desired party to be called on the party line together with means to connect the ringing current to the called line and means operative to trip the ringing current connection to the called line, the intercept circuit for intercepting calls to predetermined desired parties of the called party line including in combination, a party line intercept line circuit connected to the called party line having parties for which calls are to be intercepted from the connector, an intercept trunk circuit connected to said party line intercept line circuit, an intercept operator's cord circuit, means to detachably connect said cord circuit to said trunk circuit, switching means in said party line intercept circuit to be operated to switch the call to be intercepted through to said trunk circuit, trip means in said intercept line circuit connected with the ringing mode selecting means of the connector, means responsive to the operation of said ringing mode selecting means to thereby operate the ringing trip means in said connector when a call to a party to be intercepted is connected by said connector to the party line intercept line circuit, relay means in said trunk circuit, and means to operate said relay means in response to the connection of said cord circuit to said intercept trunk circuit to thereby operate said switching means and switch the call to be intercepted through to said cord circuit.

4. In a telephone system including a calling line, a called party line, and a directively operated party line connector for connecting the calling line with the selected called party line, said connector having directively operated means to select the mode of ringing for the selected party line in accordance with the desired party to be called on the party line together with means to connect the ringing current to the called line and means operative to trip the ringing current connection to the called line, the intercept circuit for intercepting calls to predetermined desired parties of the called party line including in combination, a party line intercept line circuit connected to the called party line having parties for which calls are to be intercepted from the connector, a source of ringback tone in said line circuit, an intercept trunk circuit connected to said party line intercept line circuit, an intercept operator's cord circuit, means to detachably connect said cord circuit to said trunk circuit, switching means in said party line intercept circuit to be operated to switch the call to be intercepted through to said trunk circuit, trip means in said intercept line circuit connected with the ringing mode selecting means of the connector, means responsive to the operation of said ringing mode selecting means to thereby operate said ringing trip means in said connector when a call to a party to be intercepted is connected by said connector to the party line intercept line circuit, means responsive to the operation of said trip means to thereby connect said ringback source to said calling line, relay means in said trunk circuit, means to operate said relay means in response to the connection of said cord circuit to said intercept trunk circuit to thereby operate said switching means and switch the call to be intercepted through to said cord circuit, and means responsive to the operation of said switching means for disconnecting said ringback tone source from said calling line.

5. In a telephone system including a calling line, a plurality of called party lines, and a directively operated party line connector for connecting the calling line with selected called party lines, said connector having directively operated means to select the mode of ringing for the selected party line in accordance with the desired party to be called on the party line together with means to connect the ringing current to the called line and means operative to trip the ringing current connection to the called line, the intercept circuit for intercepting calls to predetermined desired parties of selected called party lines including in combination, a plurality of party line intercept line circuits, a respective one each of said intercept line circuits being connected to a respective party line having parties for which calls are to be intercepted from said connector, a common intercept trunk circuit connected with all of said party line intercept circuits, an intercept operator's cord circuit, means to detachably connect said cord circuit to said trunk circuit, switching means in each of said party line circuits to be operated to switch the call to be intercepted through to said trunk circuit, relay means in said trunk circuit, means to operate said relay means in response to the connection of said cord circuit to said intercept trunk circuit to thereby operate said switching means and switch the call to be intercepted through to said cord circuit, and means interconnecting the switching means of each of said party line intercept line circuits to prevent the simultaneous operation of more than one of said switching means and thereby prevent the simultaneous switching of more than one call to be intercepted through to said cord circuit.

6. In a telephone system including a calling line, a plurality of called party lines, and a directively operated party line connector for connecting the calling line with selected called party lines, said connector having directively operated means to select the mode of ringing for the selected party line in accordance with the desired party to be called on the party line together with means to connect the ringing current to the called line and means operative to trip the ringing current connection to the called line, the intercept circuit for intercepting calls to predetermined desired parties of selected called party lines including in combination, a plurality of party line intercept line circuits, a respective one each of said intercept line circuits being connected to a respective party line having parties for which calls are to be intercepted from said connector, a common intercept trunk circuit connected with all of said party line intercept circuits, an intercept operator's cord circuit, means to detachably connect said cord circuit to said trunk circuit, switching means in each of said party line circuits to be operated to switch the call to be intercepted through to said trunk circuit, trip means in each of said intercept line circuits connected with the ringing mode selecting means of the connector, means responsive to the operation of said ringing mode selecting means to thereby operate said ringing trip means in said connector when a call to a party to be intercepted is connected by said connector to the respective party line intercept line circuit, relay means in said trunk circuit, means to operate said relay means in response to the connection of said cord circuit to said intercept trunk circuit to establish a circuit through operated contacts of said trip means of a respective intercept line circuit to thereby operate the respective switching means of the line circuit, and means interconnecting the switching means of each of said party line intercept line circuits to prevent the simultaneous operation of more than one of said switching means and thereby prevent the simultaneous switching of more than one call to be intercepted through to said cord circuit.

7. In a telephone system including a calling line, a plurality of called party lines, and a directively operated party line connector for connecting the calling line with selected called party lines, said connector having directively operated means to select the mode of ringing for the selected party line in accordance with the desired party to be called on the party line together with means to connect the ringing current to the called line and means operative to trip the ringing current connection to the called line, the intercept circuit for intercepting calls to predetermined desired parties of selected called party lines including in combination, a plurality of party line intercept line circuits, a respective one each of said intercept line circuits being connected to a respective party line having parties for which calls are to be intercepted from said connector, a common intercept trunk circuit connected with all of said party line intercept circuits, an intercept operator's cord circuit, means to detachably connect said cord circuit to said trunk circuit, switching means in each of said party line circuits to be operated to switch the call to be intercepted through to said trunk circuit, trip means in each of said intercept line circuits connected with the ringing mode selecting means of the connector, means responsive to the operation of said ringing mode selecting means to thereby operate said ringing trip means in said connector when a call to be intercepted is connected by said connector to the respective party line intercept line circuit, relay means in said trunk circuit, means to operate said relay means in response to the connection of said cord circuit to said trunk circuit to establish a circuit through operated contacts of said trip means of a respective intercept line circuit to thereby operate the respective switching means of the line circuit, and means interconnecting the switching means of each of said party line intercept line circuits to prevent the simultaneous operation of more than one of said switching means and thereby prevent the simultaneous switching of more than one call to be intercepted through to said cord circuit.

8. In a telephone system including a calling line, a plurality of called party lines, and a directively operated party line connector for connecting the calling line with selected called party lines, said connector having directively operated means to select the mode of ringing for the selected party line in accordance with the desired party to be called on the party line together with means to connect the ringing current to the called line and means operative to trip the ringing current connection to the called line, the intercept circuit for intercepting calls to predetermined desired parties of selected called party lines including in combination, a plurality of party line intercept line circuits, a respective one each of said intercept line circuits being connected to a respective party line having parties for which calls are to be intercepted from said connector, a source of ringback tone in each of said intercept line circuits, a common intercept trunk circuit connected with all of said party line intercept circuits, an intercept operator's cord circuit, means to detachably connect said cord circuit to said trunk circuit, switching means in each of said party line circuits to be operated to switch the call to be intercepted through to said trunk circuit, trip means in each of said intercept line circuits connected with the ringing mode selecting means of the connector, means responsive to the operation of said ringing mode selecting means to thereby operate said ringing trip means in said connector when a call to be intercepted is connected by said connector to the respective party line intercept line circuit, each of said trip means in said line circuits having circuit means to connect the respective ringback tone source to said calling line when the respective trip means is operated, relay means in said trunk circuit, means to operate said relay means in response to the connection of said cord circuit to said trunk circuit to establish a circuit through operated contacts of said trip means of a respective intercept line circuit to thereby operate the respective switching means of the line circuit, means responsive to the operation of said respective switching means for disconnecting said ringback tone from said calling line, and means interconnecting the switching means of each of said party line intercept line circuits to prevent the simultaneous operation of more than one of said switching means and thereby prevent the simultaneous switching of more than one call to be intercepted through to said cord circuit.

9. In a telephone system including a calling line, a called party line, and a directively operated party line connector for connecting the calling line with the selected called party line, said connector having directively operated means to select the mode of ringing for the selected party line in accordance with the desired party to be called on the party line together with means to connect the ringing current to the called line and means operative to trip the ringing connection to the called line, the intercept circuit for intercepting calls to predetermined desired parties of the called party line including in combination, a party line intercept line circuit connected to the called party line having parties for which calls are to be intercepted from the connector, a source of ringback tone in said line circuit, trip means in said intercept line circuit connected with the ringing mode selecting means of the connector, means responsive to the operation of the ringing mode selecting means to thereby operate the ringing trip means in said connector immediately after a call to a party to be intercepted is connected by said connector to the party line intercept line circuit, said trip means having circuit means to connect said ringback tone source to said calling line when said trip means is operated.

References Cited in the file of this patent

UNITED STATES PATENTS 2,608,620 Kessler ---------------- Aug. 26, 1952